United States Patent
Daalderop et al.

(10) Patent No.: US 9,654,703 B2
(45) Date of Patent: May 16, 2017

(54) ILLUMINATION APPARATUS

(71) Applicant: NXP B.V., Eindhoven (NL)

(72) Inventors: Gerardo Henricus Otto Daalderop, Best (NL); Han Raaijmakers, Eindhoven (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/480,086

(22) Filed: Sep. 8, 2014

(65) Prior Publication Data

US 2016/0073041 A1  Mar. 10, 2016

(51) Int. Cl.
| H04N 5/33 | (2006.01) |
| G01S 17/89 | (2006.01) |
| H04N 5/225 | (2006.01) |
| G02B 23/12 | (2006.01) |

(52) U.S. Cl.
CPC ............... *H04N 5/33* (2013.01); *G01S 17/89* (2013.01); *G02B 23/12* (2013.01); *H04N 5/2256* (2013.01)

(58) Field of Classification Search
CPC ........... H04N 5/33; G01S 17/02–17/58; G01S 17/66; G01S 17/93–17/936; G01S 7/483–7/489; G06K 9/00805; G06K 9/00825; G06K 9/4661; G06K 9/2027; G06K 9/2036
See application file for complete search history.

(56) References Cited

U.S. PATENT DOCUMENTS

| 4,091,412 | A | 5/1978 | Salonimer |
| 6,603,507 | B1 | 8/2003 | Jiang et al. |
| 6,803,574 | B2 | 10/2004 | Abel et al. |
| 9,002,511 | B1* | 4/2015 | Hickerson ............. G01S 17/026 700/245 |
| 2001/0050340 | A1* | 12/2001 | Holz ....................... G01S 7/484 250/341.1 |
| 2003/0198271 | A1* | 10/2003 | Matveev .................. B60Q 1/14 372/92 |

(Continued)

FOREIGN PATENT DOCUMENTS

| EP | 1392054 A2 | 4/2004 |
| EP | 1392054 A3 | 4/2004 |

OTHER PUBLICATIONS

Anonymous : "Anti-blinding scheme for near-infrared diode-laser-based active night-vison", Research Disclosure, Mason Publications, Hampshire, GB, vol. 440, No. 103, (Dec. 1, 2000).

(Continued)

Primary Examiner — Paul Berardesca

(57) ABSTRACT

One example discloses an illumination apparatus, including: a first illumination source, having a pulsed illumination output structure; and a capture sensor, having an image capture structure synchronized with and responsive to reflection signals generated by the pulsed illumination output signal structure. Another example discloses an article of manufacture including at least one non-transitory, tangible machine readable storage medium containing executable machine instructions for illumination which include: transmitting a first pulsed illumination signal from a first illumination source; capturing an image; and synchronizing the transmitting and capturing with a synchronization trigger.

19 Claims, 6 Drawing Sheets

(56) References Cited

U.S. PATENT DOCUMENTS

2005/0247862 A1 11/2005 Faytlin et al.
2010/0194942 A1* 8/2010 Wada ..................... G01S 17/48
                                                                  348/294
2011/0074956 A1 3/2011 Faber et al.

OTHER PUBLICATIONS

Extended European Search Report for Patent Appln. No. 15184142.6 (Jan. 25, 2016).

* cited by examiner

ILLUMINATION APPARATUS

BACKGROUND

Brief Background Introduction

This specification relates generally to devices, apparatus, systems, articles, instructions and methods for object detection and tracking. In one example this specification relates to an illumination apparatus for object detection and tracking.

SUMMARY

An illumination apparatus, comprising: a first illumination source, having a pulsed illumination output structure; and a capture sensor, having an image capture structure synchronized with and responsive to reflection signals generated by the pulsed illumination output signal structure. An article of manufacture comprises at least one non-transitory, tangible machine readable storage medium containing executable machine instructions for illumination which comprise: transmitting a first pulsed illumination signal from a first illumination source; capturing an image; and synchronizing the transmitting and capturing with a synchronization trigger.

The above summary does not represent every example embodiment within the scope of the current or future Claim sets. Additional example embodiments are discussed within the Figures and Detailed Description below.

Figure 1:
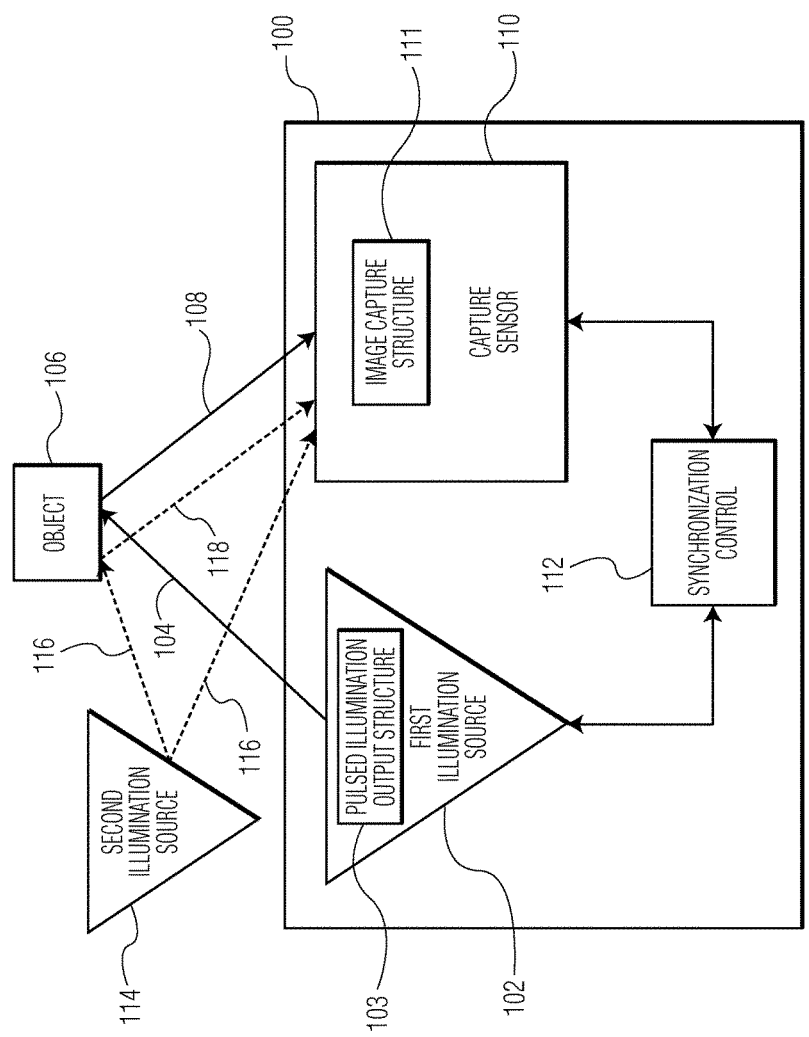
FIG. 1 is an example illumination apparatus.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Object detection and tracking systems can support a variety of applications including: wearable systems (e.g. carried by a person), security systems, driver warning systems, driving assistance systems, autonomous driving systems, robotics systems, military systems, and Advanced Driving Assistance System (ADAS) systems. Such object detection and tracking systems can be particularly useful in conditions of poor, limited or no visibility (e.g. at nighttime).

Active Infrared (IR) illumination is one possibility for object detection and tracking, and can be packaged with other systems such as radar, lidar, and ultrasound. Such systems can use one or more infrared cameras to detect and track objects based on a reflected IR from an object actively illuminated.

Far-infrared (FIR) systems, which make use of infrared emissions of warm objects, can be used and are good for night vision requirements. A disadvantage of Far-infrared is their high cost and strict requirements and/or limitations for camera placement.

An alternative example is Near-infrared (NIR) lighting using LEDs. NIR LEDs have fast-switching times, are capable of transmitting high power signals, and enable faster frame rate systems having shorter image-processing (e.g. integration) times. The Near-infrared spectrum ranges between approximately 800 and 900 nm in wavelength.

Since these wavelengths are outside of the visible range (i.e. which ranges from about 380 to 780 nm in wavelength), Near-infrared systems do not disturb others, such as the drivers of other vehicles on a road.

A growing use of such active infrared systems in vehicles and other objects may lead to such systems on multiple vehicles or at multiple locations to interfere with each other, rendering such object detection and tracking systems much less sensitive and reducing user confidence. For example, one NIR system could blind (e.g. saturate, wash out, etc.) another automobile based NIR system rendering the blinded system dangerously ineffective, in a manner similar to what drivers face with visible headlights.

An example NIR system employing small-pulse-width, high power infrared pulses at a medium pulse rate/frequency can achieve better visibility and better object-detection and tracking possibilities in poor light conditions (e.g. at night) and would be less susceptible to interference from other continuous or pulsed NIR illumination sources. For example, spurious illumination sources that are continuously-on have a lower power compared to a high-power pulse from a main illumination source, and would thus become a less disturbing source of interference.

Synchronizing such high-power pulses with a capture sensor's (e.g. camera's) shutter would further prevent interference from such secondary infrared sources and reflections. With such a system a reduction of spurious signal interference scales directly with: a ratio of the NIR illumination pulse width to the illumination pulse rate/frequency as compared to other vehicles employing such a high-power pulsed system; and a ratio of the high pulse power to the low continuous power of steady-state (e.g. always on) systems that do not employ such a high-power pulsed system.

Figure 2:
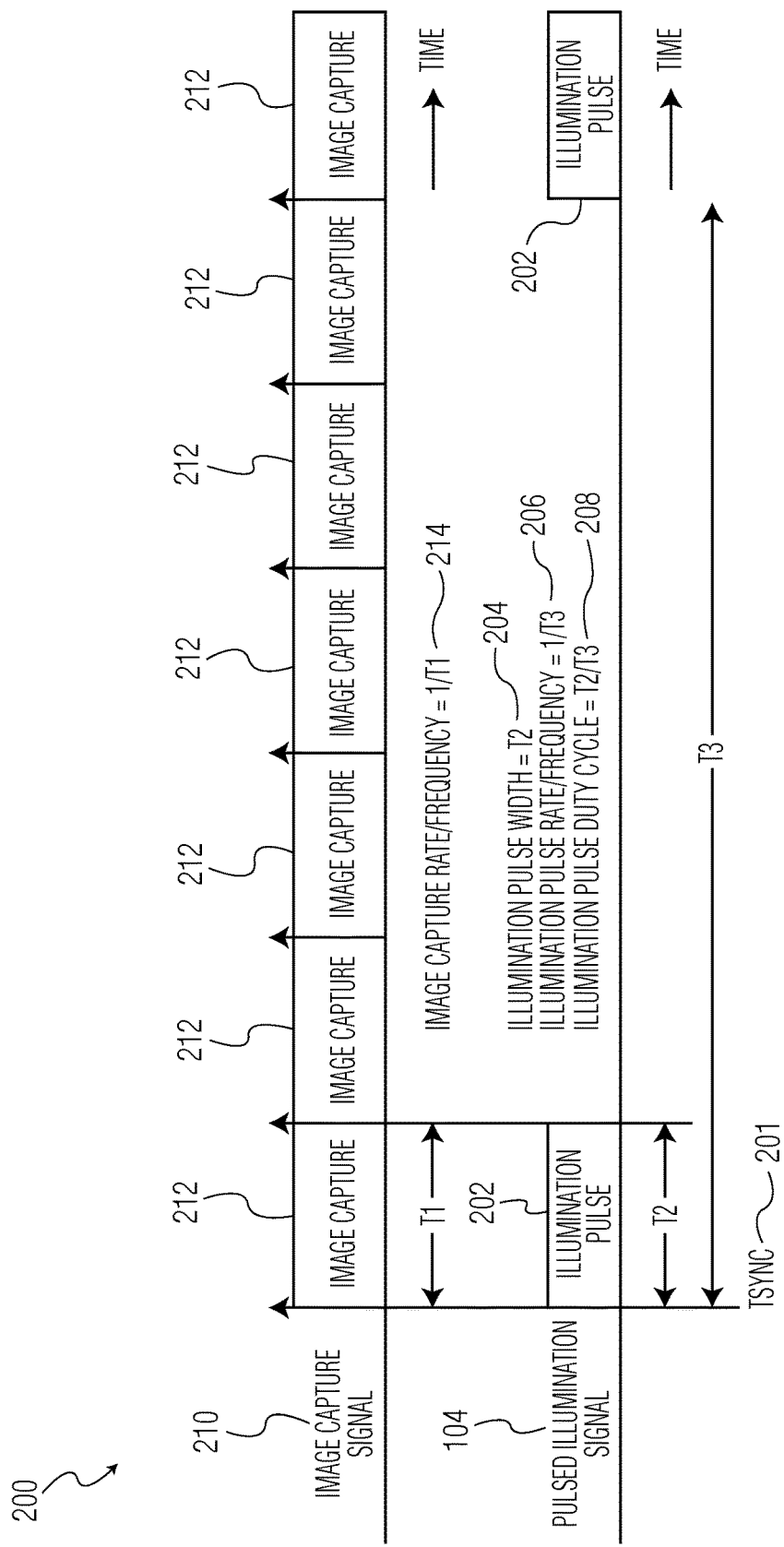
FIG. 2 is an example timing diagram for enabling an illumination apparatus.

FIG. 1 is an example illumination apparatus 100. FIG. 2 is an example timing diagram 200 for enabling an illumination apparatus 100. FIGS. 1 and 2 are discussed together. In various examples the illumination apparatus 100 can be part of: a wearable device, a security system, a driver warning system, a driving assistance system, an autonomous driving system, a robotics system, or an Advanced Driving Assistance System (ADAS) system.

The illumination apparatus 100 includes a first illumination source 102 (e.g. primary/main illumination), having a pulsed illumination output structure 103, and generating a first illumination source output signal 104, which can be either pulsed or continuous. In various examples the illumination source 102 can be an infrared source, an infrared LED, or a near infrared source.

In one example embodiment, the first illumination signal 104 includes an illumination pulse 202 having an illumination pulse width (T2) 204 and is transmitted at an illumination pulse rate/frequency (1/T3) 206. The ratio of the illumination pulse width (T2) 204 to the illumination pulse period (T3) is an illumination pulse duty cycle (T2/T3) 208. The power of the illumination pulse 202 is shown in FIG. 2 as an area under the illumination pulse 202 curve.

Figure 3:
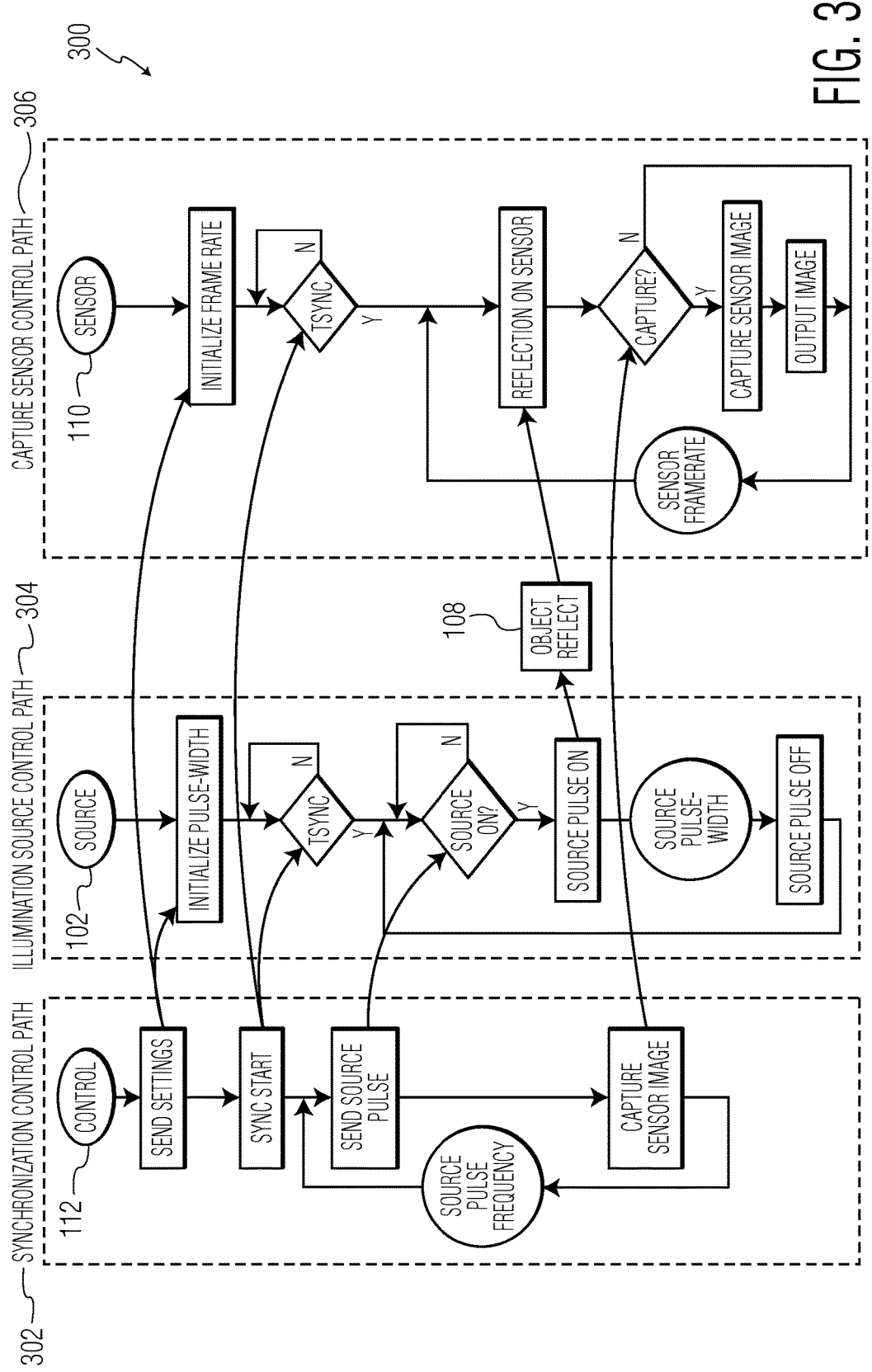
FIG. 3 is a first example state diagram for enabling an illumination apparatus.
Figure 4:
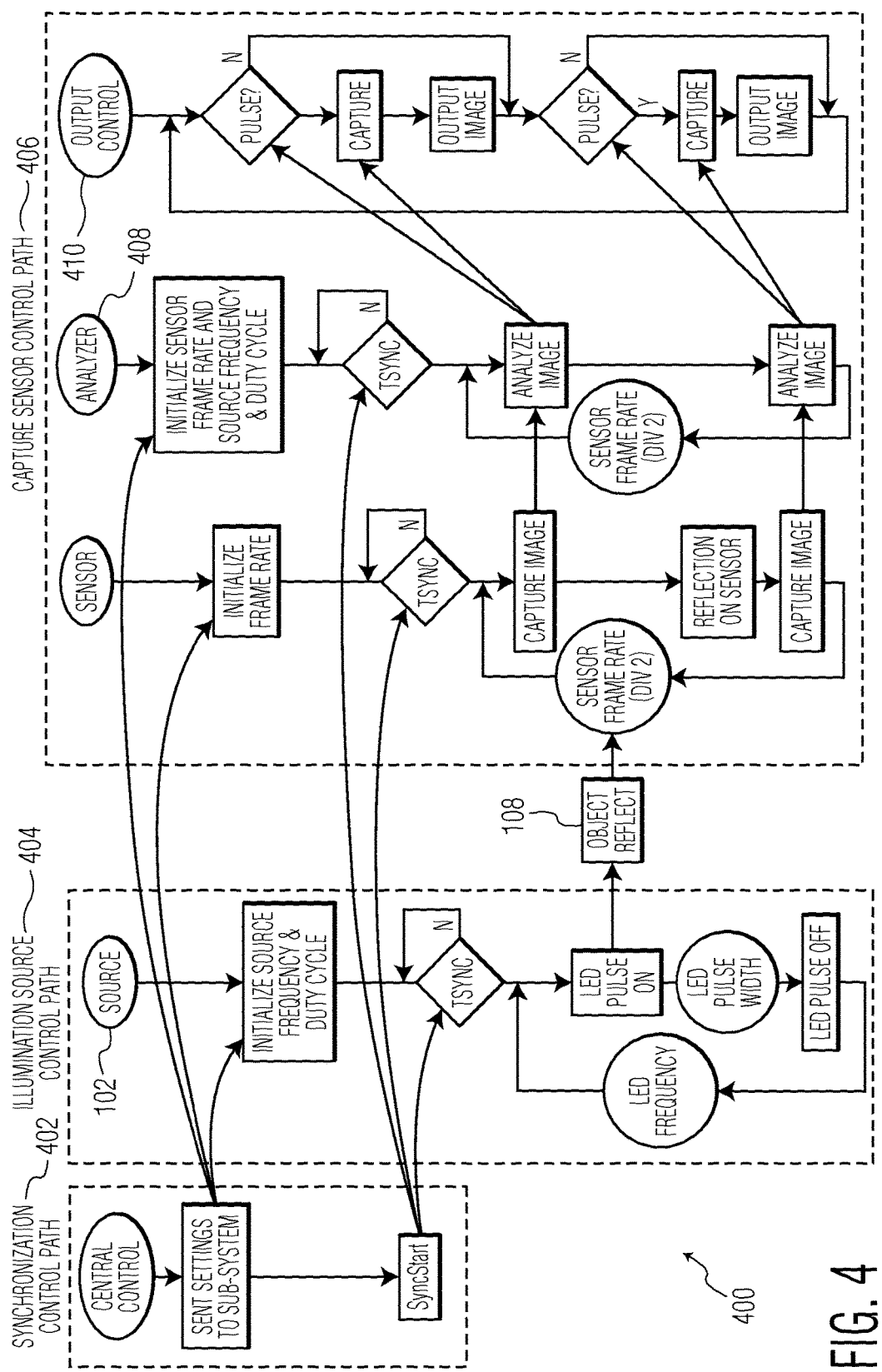
FIG. 4 is a second example state diagram for enabling an illumination apparatus.

In one example embodiment the first illumination signal 104 is managed by both an illumination source control path and a synchronization control path, such as shown in FIG. 3 and further discussed below. In another example embodiment the first illumination signal 104 is primarily managed just by illumination source control path, such as shown in FIG. 4 and also further discussed below.

When an object 106 is present within a predefined range of the illumination apparatus 100, the first illumination signal 104 reflects off of the object 106, thereby generating a first reflection signal 108.

The illumination apparatus 100 also includes a capture sensor 110. The capture sensor 110 includes an image capture structure 111, receives the first reflection signal 108 and in response generates an image capture signal 210. In various examples the capture sensor 110 can be either: an infrared sensor; a sensor which detects energy having a wavelength longer than 800 nm; or a sensor which detects energy having a wavelength between 800-900 nm.

The image capture signal 210 includes a set of image capture 212 events having an image capture rate/frequency 214 (e.g. Frame Rate)=1/T1, as shown in FIG. 2. In one example, each image capture 212 event includes: a capture moment, an integration/processing time, and a transfer to storage (e.g. empty image buffer) time, which together are identified as time T1 in FIG. 2.

In one example embodiment the image capture signal 210 is controlled by both a capture sensor control path and the previously mentioned synchronization control path, such as shown in FIG. 3 and further discussed below. In another example embodiment the image capture signal 210 is locally managed just by capture sensor control path, such as shown in FIG. 4 and also further discussed below.

The capture sensor control path, controls the image capture structure's 111 sampling of the reflection signal 108. This control can be based on signals received from either: the synchronization control path, a network interconnect, or by analyzing the reflection signal 108 (e.g. light pulses visible in the captured image).

A synchronization control 112 is also included in the illumination apparatus 100. The synchronization control 112 includes a trigger circuit which generates a synchronization trigger (Tsync) 201. The synchronization trigger (Tsync) 201 synchronizes the image capture 212 with the reflection signals 108 generated by the pulsed illumination output signal structure 103.

In one example the trigger circuit activates the pulsed illumination output structure 103 in response to the image capture 212 (e.g. a capture signal from the image capture structure 111). In another example the trigger circuit activates the image capture structure 111 when the illumination source 102 generates the first illumination signal 104 (e.g. a pulse signal from the pulsed illumination output structure 103). If the image capture structure 111 includes a shutter, the trigger circuit activates the shutter, resulting in an image capture 212.

In one example embodiment shown in FIG. 2, the image capture rate/frequency (1/T1) 214 of the capture sensor 110 is greater than the illumination pulse rate/frequency (1/T3) 206 of the illumination source 102. Such a higher capture rate enables the illumination apparatus 100 to more effectively discriminate the first illumination signal 104 from any second illumination source output signals 116 (pulsed or continuous) or second reflection signals 118 generated by a second illumination source 114 (e.g. a spurious or interfering illumination source).

In view of the above discussion, one of the benefits from the pulsed timing of the illumination source output signal 104 include being able to design a shorter illumination pulse duty cycle 208 (i.e. T2/T3) which reduces a chance of other pulsed sources (herein defined as compliant sources) such as the second illumination source's 114 second illumination output signal 116 or second reflection signal 118, interfering with the first reflection signal 108.

Some of the benefits from the pulsed power of the illumination source output signal 104 include setting the illumination pulse's 202 peak power to at least five times larger than the illumination source's 102 or second illumination source's 114 maximum continuous (e.g. steady state) power output. Such a high power pulse would exceed the second illumination source's 114 continuous power output (i.e. defined as non-compliant sources) and thereby make less prevalent the second illumination source output signal 116 and second reflection signal 118 (i.e. direct and reflective signals) from the second illumination source 114. This permits a more robust interpretation of the image.

An example set of illumination source 102 and capture sensor 110 numbers are: illumination pulse rate/frequency 206=25-50 Hz; illumination pulse period (T3)=$\frac{1}{25}$-$\frac{1}{50}$ sec; synchronization trigger (Tsync) 201 synchronizes illumination pulse 202 with image capture 212 (i.e. shutter time plus camera integration time) such that T1=T2=$\frac{1}{200}$ sec.; and illumination pulse 202 duty cycle 204 T2/T3 (25%-12%).

FIG. 3 is a first example state diagram 300 for enabling an illumination apparatus 100. The diagram 300 shows a synchronization control path 302, an illumination source control path 304, and a capture sensor control path 306.

These three paths 302, 304 and 306 respectively describe one example set of operations for the synchronization control 112, the illumination source 102, and the capture sensor 110. In this example the synchronization control path 302 separately initiates all operations and transmits a synchronization trigger (Tsync) 201 signal. Operation of the illumination apparatus 100 under the state diagram 300 is self-explanatory. In an alternate embodiment, the synchronization control path 302 can be integrated with either the illumination source control path 304, the capture sensor control path 306, or another (not shown) controller in the illumination apparatus 100. The signal path delays within and between these three control paths 302, 304 and 306 are typically negligible compared to the illumination pulse rate/frequency (1/T3) 206.

FIG. 4 is a second example state diagram 400 for enabling an illumination apparatus 100. The diagram 400 shows a synchronization control path 402, an illumination source control path 404, and a capture sensor control path 406.

In this example embodiment, the capture sensor control path 406 processes a set of captured images to detect the illumination source output signal 104 generated by the illumination source 102. Cases where an object 106 is detected by an analyzer 408, as well as where the object 106 is not, are shown in FIG. 4.

In this example embodiment the illumination and capture control paths 404 and 406 run autonomously after an initial Tsync signal 201 (i.e. SyncStart) is received. The capture sensor control path 406 repeatedly captures images from the capture sensor 110 whether or not the illumination source 102 has transmitted an illumination pulse 202. An analyzer 408 within the capture sensor control path 406 uses a pulse detection algorithm to determine whether the capture sensor 110 has captured a "sufficiently bright" reflection signal 108.

"Sufficiently bright" is herein defined as a reflection signal 108 power that exceeds a predetermined threshold power level, which in one example is based on the illumination pulse 202 pulse width (T2) 204, pulse rate/frequency (1/T3) 206, and duty cycle (T2/T3) 208. Thus object 106 detection is made more robust when the analyzer 408 knows these 202, 204, 206 and 208 values.

Upon detecting a sufficiently bright reflection signal 108, the analyzer 408 commands an output control 410 to output the image to a storage device (see FIG. 6 item 608) for eventual display or further processing. A sufficiently bright reflection signal 108 indicates that the object 106 has been detected by the illumination apparatus 100. In an alternate embodiment, the synchronization control path 402 and the Tsync elements shown in the illumination source control path 404 and the capture sensor control path 406 can be deleted.

Figure 5:
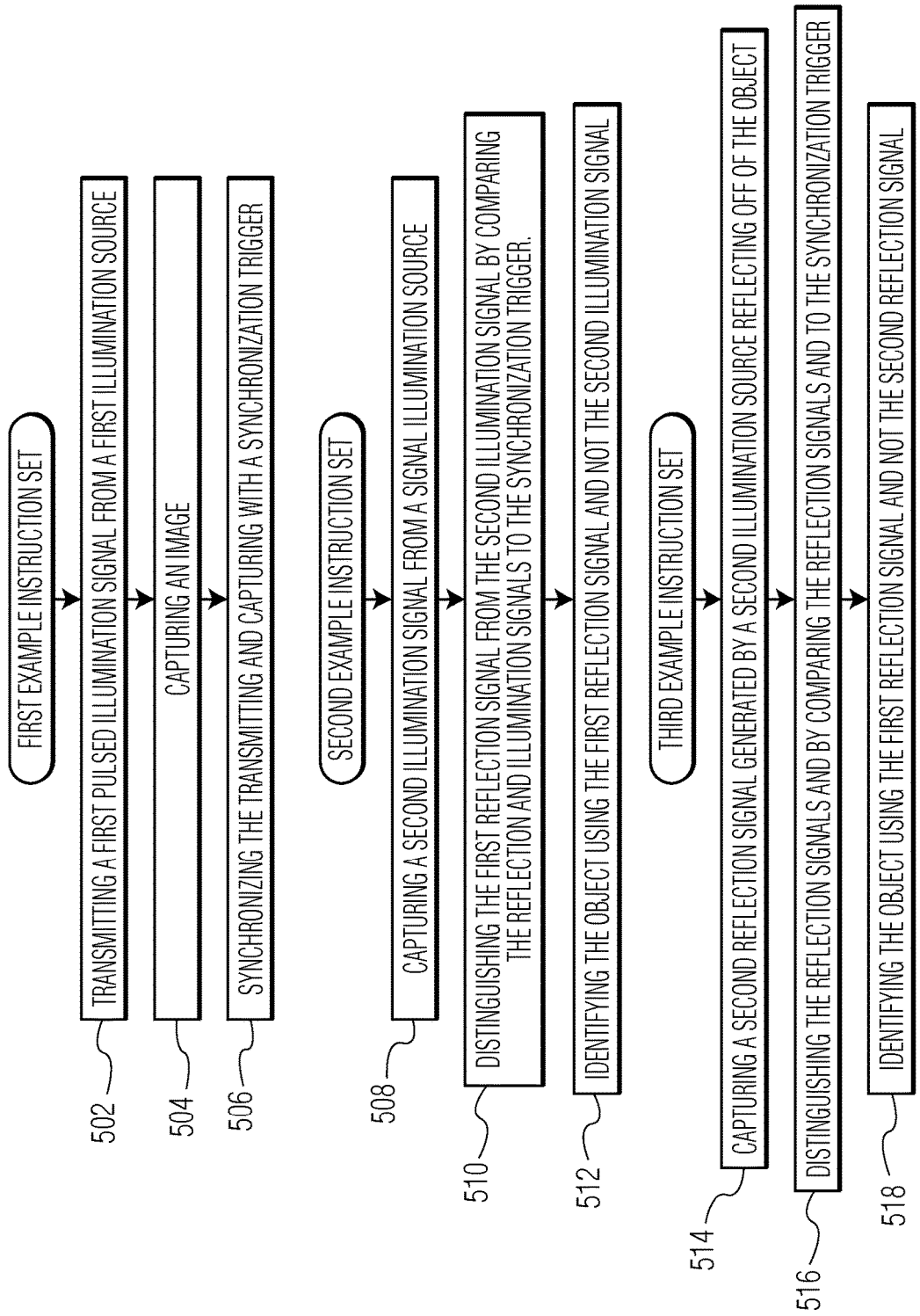
FIG. 5 is an example list of instructions for enabling an illumination apparatus.

FIG. 5 is an example list of instructions for enabling an illumination apparatus. The example list includes a first example instruction set, a second example instruction set, and a third example instruction set.

The first example instruction set begins in block 502, by transmitting a first pulsed illumination signal from a first illumination source. In one example, the pulsed illumination signal is at least one of: an infrared signal; an infrared LED signal; or a near infrared signal. Next, in block 504, capturing an image. In one example the captured image is a first reflection signal generated by the first pulsed illumination signal reflecting off of an object. Then in block 506, synchronizing the transmitting and capturing with a synchronization trigger. In one example synchronizing includes generating the synchronization trigger in response to the first pulsed illumination signal. In another example synchronizing includes generating the synchronization trigger in response to capturing the image. In one example embodiment, the images are capture at a first rate, and the first pulsed illumination signal is transmitted at a second rate, wherein the second rate is less than the first rate.

The instructions/method can be augmented with one or more of the following additional blocks, presented in no particular order.

The second example instruction set begins in block 508, capturing a second illumination signal from a second illumination source. Next in block 510, distinguishing the first reflection signal from the second illumination signal by comparing the reflection and illumination signals to the synchronization trigger. Then in block 512, identifying the object using the first reflection signal and not the second illumination signal.

The third example instruction set begins in block 514, capturing a second reflection signal generated by a second illumination source reflecting off of the object. Next in block 516, distinguishing the reflection signals and by comparing the reflection signals and to the synchronization trigger. Then in block 518, identifying the object using the first reflection signal and not the second reflection signal.

While these instructions have been presented in example orders of execution, other orderings, such as discussed with respect to FIGS. 3 and 4, are also possible.

Figure 6:
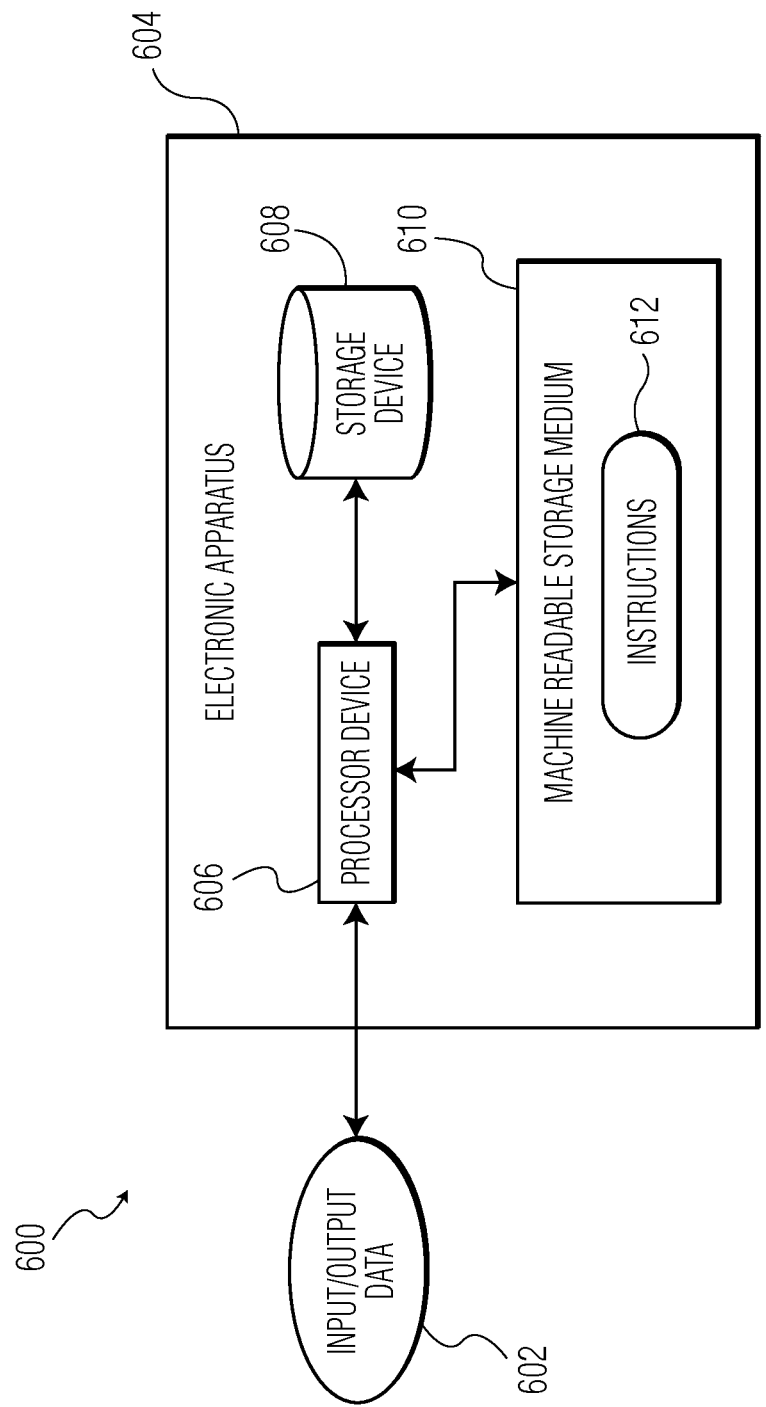
FIG. 6 is an example electronic apparatus for hosting instructions for enabling an illumination apparatus.

FIG. 6 is an example system 600 for hosting instructions for enabling an illumination apparatus. The system 600 shows an input/output data 602 interface with an electronic apparatus 604. The electronic apparatus 604 includes a processor 606, a storage device 608, and a machine-readable storage medium 610. The machine-readable storage medium 610 includes instructions 612 which control how the processor 606 receives input data 602 and transforms the input data into output data 602, using data within the storage device 608. Example instructions 612 stored in the machine-readable storage medium 610 are discussed elsewhere in this specification. The machine-readable storage medium in an alternate example embodiment is a computer-readable storage medium.

The processor (such as a central processing unit, CPU, microprocessor, application-specific integrated circuit (ASIC), etc.) controls the overall operation of the storage device (such as random access memory (RAM) for temporary data storage, read only memory (ROM) for permanent data storage, firmware, flash memory, external and internal hard-disk drives, and the like). The processor device communicates with the storage device and machine-readable storage medium using a bus and performs operations and tasks that implement one or more blocks stored in the machine-readable storage medium. The machine-readable storage medium in an alternate example embodiment is a computer-readable storage medium.

The blocks comprising the instructions and/or flowcharts in the above Figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer-usable storage medium or media is (are) considered to be part of an article (or article of manufacture). An article or article of manufacture can refer to any manufactured single component or multiple components. The non-transient machine or computer-usable media or mediums as defined herein excludes signals, but such media or mediums may be capable of receiving and processing information from signals and/or other transient mediums. The storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; and optical media such as Compact Disks (CDs) or Digital Versatile Disks (DVDs).

In one example, one or more blocks or steps discussed herein are automated. The terms automated or automatically (and like variations thereof) mean controlled operation of an apparatus, system, and/or process using computers and/or mechanical/electrical devices without the necessity of human intervention, observation, effort and/or decision.

In this specification, example embodiments have been presented in terms of a selected set of details. However, a person of ordinary skill in the art would understand that many other example embodiments may be practiced which include a different selected set of these details. It is intended that the following claims cover all possible example embodiments.

What is claimed is:

1. An illumination apparatus, comprising:
a synchronization control having a trigger signal output;
a first illumination source, having a pulsed illumination output structure configured to transmit a first set of pulsed illumination signals at a first frequency in response to a trigger signal on the trigger signal output; and
a capture sensor, having an image capture structure configured to capture a first set of images, in response to the trigger signal, wherein the first set of captured images comprises reflection signals at the first frequency generated by the first set of pulsed illumination signals reflecting off of an object and a set of spurious signals at a second frequency generated by a second illumination source and detect the object using the reflection signals at the first frequency when power of the reflection signals exceeds a predetermined threshold power level based upon an illumination pulse width and an illumination pulse frequency.

2. The apparatus of claim 1, wherein the synchronization control further comprises:
a trigger circuit configured to activate the pulsed illumination output structure in response to a capture signal from the image capture structure.

3. The apparatus of claim 1, wherein the synchronization control further comprises:
a trigger circuit configured to activate the image capture structure in response to a pulse signal from the pulsed illumination output structure.

4. The apparatus of claim 2, wherein the image capture structure further comprises a shutter; and the trigger circuit is configured to activate the shutter.

5. The apparatus of claim 1, wherein the image capture structure has an image capture frame rate and the pulsed illumination output structure has a pulsed illumination frame rate which is less than the image capture frame rate.

6. The apparatus of claim 1, wherein the illumination source is an infrared source.

7. The apparatus of claim 1, wherein the capture sensor is an infrared sensor.

8. The apparatus of claim 1, wherein the illumination apparatus is embodied in at least one of: a wearable device, a security system, a driver warning system, a driving assistance system, an autonomous driving system, a robotics system, or an Advanced Driving Assistance System (ADAS) system.

9. An article of manufacture comprises at least one non-transitory, tangible machine readable storage medium containing executable machine instructions for illumination which comprise:
instructions for generating a synchronization trigger signal;
instructions for transmitting a first set of pulsed illumination signals from a first illumination source at a first frequency, in response to the synchronization trigger signal;
instructions for capturing a first set of images, in response to the synchronization trigger signal, wherein the first set of captured images include a first set of reflection signals at the first frequency generated by the first set of pulsed illumination signals reflecting off of an object and a set of spurious signals at a second frequency generated by a second illumination source; and
instructions for detecting the object using the reflection signals at the first frequency when power of the first set of reflection signals exceeds a predetermined threshold power level based upon an illumination pulse width and an illumination pulse frequency.

10. The article of manufacture of claim 9, wherein the pulsed illumination signal is an infrared signal.

11. The article of manufacture of claim 9, further comprising:
instructions for generating the synchronization trigger signal in response to the first set of pulsed illumination signals.

12. The article of manufacture of claim 9, further comprising:
instructions for generating the synchronization trigger signal in response to capturing the first set of images.

13. The article of manufacture of claim 9, further comprising:
instructions for capturing the first set of images at a first frame rate; and
instructions for transmitting the first set of pulsed illumination signals at a second frame rate, wherein the second frame rate is less than the first frame rate.

14. The article of manufacture of claim 9, further comprising:
instructions for transmitting a second set of pulsed illumination signals from the first illumination source at the first frequency;
instructions for capturing a second set of images, wherein the second set of captured images include a second set of reflection signals generated by the second set of pulsed illumination signals reflecting off of the object, but do not include the set of spurious signals.

15. The instructions of claim 9, wherein the set of spurious signals include at least one of: an illumination signal directly from the second illumination source, or a reflection signal indirectly from the second illumination source.

16. The instructions of claim 9, wherein the reflection signals and spurious signals are not in a same one of the first set of captured images.

17. The apparatus of claim 6, wherein the infrared source is a near infrared source having a wavelength between 800-900 nm.

18. The apparatus of claim 7, wherein the infrared sensor is configured to detect energy having a wavelength between 800-900 nm.

19. The article of manufacture of claim 10, wherein the infrared signal is a near infrared signal having a wavelength between 800-900 nm.

* * * * *